United States Patent
Connors et al.

(10) Patent No.: US 11,227,183 B1
(45) Date of Patent: Jan. 18, 2022

(54) SECTION SEGMENTATION BASED INFORMATION RETRIEVAL WITH ENTITY EXPANSION

(71) Applicant: ACCENTURE GLOBAL SOLUTIONS LIMITED, Dublin (IE)

(72) Inventors: Colin Connors, Campbell, CA (US); Ditty Mathew, Vaikom (IN); Emmanuel Munguia Tapia, San Jose, CA (US); Anwitha Paruchuri, San Jose, CA (US); Anshuma Chandak, San Jose, CA (US); Tsunghan Wu, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/007,845

(22) Filed: Aug. 31, 2020

(51) Int. Cl.
    *G06K 9/68* (2006.01)
    *G06K 9/62* (2006.01)
    *G06F 16/36* (2019.01)
    *G06F 40/279* (2020.01)

(52) U.S. Cl.
    CPC ......... *G06K 9/6215* (2013.01); *G06F 16/367* (2019.01); *G06F 40/279* (2020.01); *G06K 9/623* (2013.01); *G06K 9/6223* (2013.01)

(58) Field of Classification Search
    CPC .... G06K 9/6215; G06K 9/6223; G06K 9/623; G06F 16/367; G06F 40/279
    USPC ......................................................... 382/218
    See application file for complete search history.

(56) References Cited

U.S. PATENT DOCUMENTS

| | | | |
|---|---|---|---|
| 6,965,861 B1 | 11/2005 | Dailey et al. | |
| 9,558,271 B1 | 1/2017 | Sathe et al. | |
| 9,864,795 B1* | 1/2018 | Halevy | G06F 16/285 |
| 2005/0080656 A1 | 4/2005 | Crow et al. | |
| 2009/0144609 A1* | 6/2009 | Liang | G06F 40/10 715/230 |
| 2011/0320459 A1* | 12/2011 | Chisholm | G06F 16/36 707/748 |
| 2013/0166303 A1* | 6/2013 | Chang | G06F 16/7834 704/258 |

(Continued)

OTHER PUBLICATIONS

Le Van-Duyet, et al., "Skill2vec: Machine Learning Approach for Determining the Relevant Skills from Job Description", Oct. 9, 2019, (3 pages).

(Continued)

*Primary Examiner* — Charlotte M Baker
(74) *Attorney, Agent, or Firm* — Mannava & Kang, P.C.

(57) ABSTRACT

A data extraction and expansion system receives documents with data to be processed, extracts a set of a specific type of entities from the received documents, expands the set of entities by retrieving additional entities of the specific type from an ontology and other external data sources to improve the match between the received documents. The ontology includes data regarding entities and relationships between entities. The ontology is built by extracting the entity and relationship information from external data sources and can be constantly updated. If the additional entities to expand the set of entities cannot be retrieved from the ontology then a real-time search of the external data sources is executed to retrieve the additional entities from the external data sources.

20 Claims, 13 Drawing Sheets

(56) References Cited

U.S. PATENT DOCUMENTS

2018/0232443 A1* 8/2018 Delgo .................... G06F 16/35

OTHER PUBLICATIONS

Michael Tepper et al., Statistical Section Segmentation in Free-Text Clinical Records, Department of Linguistics, Biomedical and Health Informatics University of Washington, 2008, pp. 2001-2008, (8 pages).
Kun Yu et al., "Resume Information Extraction with Cascaded Hybrid Model", University of Science and Technology of China, Jun. 2005, pp. 499-506, (8 pages).
Tristan Crockett et al. "Skills-ML: An Open Source Python Library for Developing and Analyzing Skills and Competencies from Unstructured Text", University of Chicago, Nov. 5, 2018, (39 pages).

* cited by examiner

1150

FIRST LAST NAME
WEBSITE 1  WEBSITE 2  WEBSITE 3
ADDRESS  PHONE NUMBER
— 1152

| EDUCATION | |
|---|---|
| INSTITUTION / DEGREE | DATES ATTENDED |
| LLOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. | |
| INSTITUTION / DEGREE | DATES ATTENDED |
| LLOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. | |

— 1154

TECHNICAL SKILLS
- JAVA, J2EE, JPA
- WEB DEVELOPMENT
- BIG DATA, HADOOP

— 1156

| WORK EXPERIENCE | |
|---|---|
| COMPANY NAME | DATES ATTENDED |
| JOB TITLE | |
| - LLOREM IPSUM DOLOR SIT MATLAB AMET, CONSECTETUR ADIPISCING ELIT, API SED DO EIUSMOD TEMPOR INCIDIDUNT UT LABORE ET DOLORE MAGNA ALIQUA. | |
| - SQL TEMPOR INCIDIDUNT UT LABORE ET DOLORE MAGNA ALIQU PYTHON. | |

— 1158

PROJECTS (AVAILABLE IN GITHUB)

PROJECT TITLE
- LOCAL OUTLIER FACTOR (LOF) ALGORITHM, CONSECTETUR ADIPISCING ELIT, SED DO EIUSMOD TEMPOR INCIDIDUNT UT LABORE ET MAPREDUCE.

- AWS TEMPOR INCIDIDUNT REACT UT LABORE ET BOOTSTRAP MAGNA ALIQ.
- RESTFUL API, SWAGGER, API GETAWAY UT CONSEC RUTET DJANGO.

SECTION SEGMENTATION BASED INFORMATION RETRIEVAL WITH ENTITY EXPANSION

BACKGROUND

Information extraction includes automatically extracting data from different data types such as structured data, unstructured data, etc. The data may be received via different types of documents such as machine-readable documents and other electronic data sources like databases, etc. The term 'information extraction' refers to extracting data from textual content although in certain cases, the term may also refer to extracting data from multimedia content. Unstructured data refers to data such as text files wherein the textual content is not formatted. Structured data can include well-formatted, domain-specific data. Among the various Artificial Intelligence (AI) and Machine Learning (ML) algorithms are used to achieve automatic information extraction from documents, the most basic techniques include syntactic rules and Natural Language Processing (NLP) techniques. NLP exploits the syntactic structures and grammatical rules to derive useful information from the sentences in the textual content.

BRIEF DESCRIPTION OF DRAWINGS

Features of the present disclosure are illustrated by way of examples shown in the following figures. In the following figures, like numerals indicate like elements, in which:

FIG. 11B shows an example document with individual sections and the candidate text for entity extraction identified in accordance with the examples disclosed herein.

DETAILED DESCRIPTION

Figure 1:
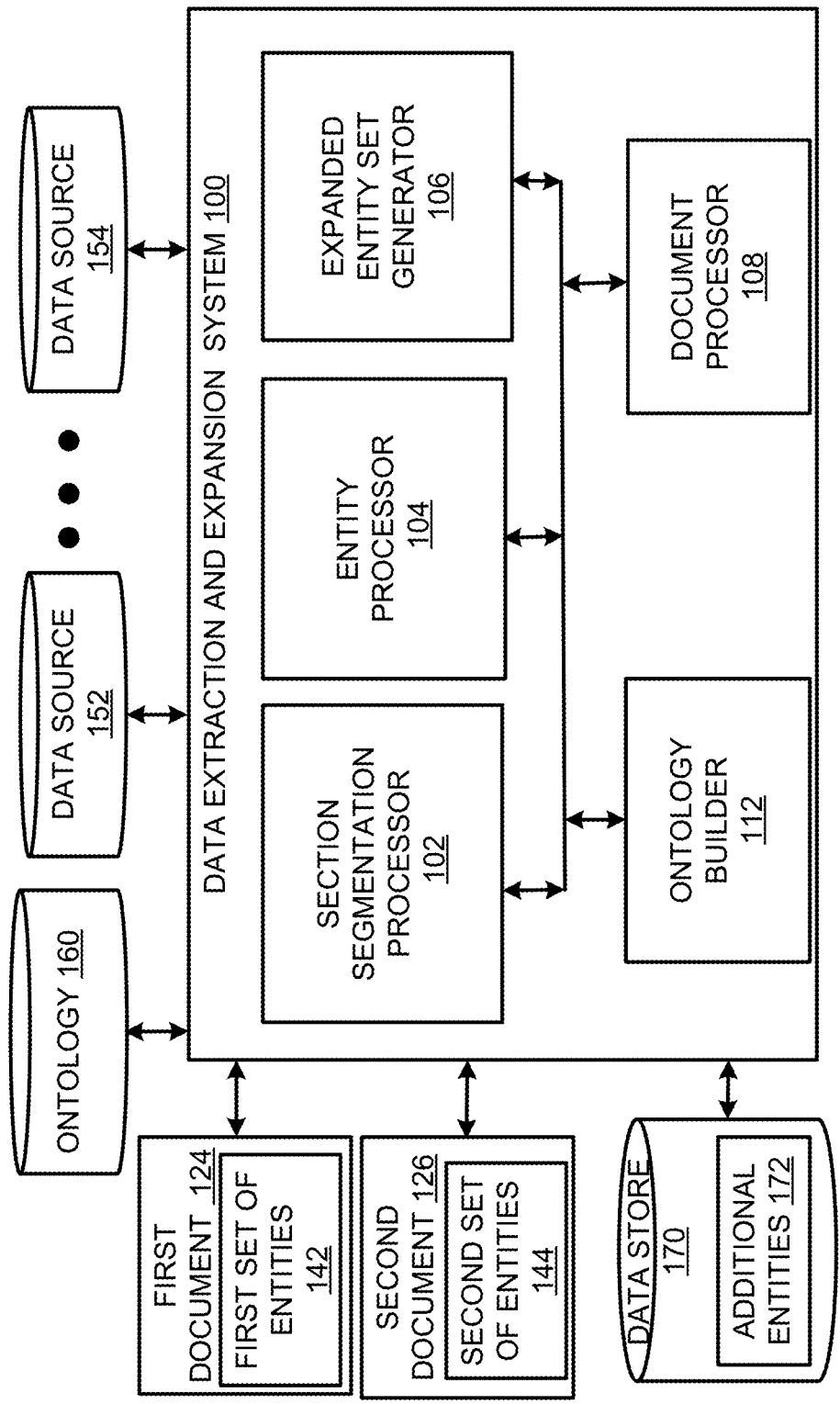
FIG. 1 shows a block diagram of a data extraction and expansion system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A data extraction and expansion system that receives at least two documents including data that is to be matched, improves the likelihood of the match by expanding entities to be matched on and outputs the extent of match between the two documents is disclosed. Each of the documents can include textual content associated with certain domain-specific information and formatted into different sections wherein each section includes a heading followed by a body text. The data extraction and expansion system is configured to individually identify the different sections for each document. The data extraction and expansion system extracts a specific type of entities from each of the documents that are important to determine the match therebetween. Certain sections of the documents can predominantly include the specific type of entities that are extracted. The data extraction and expansion system is, therefore, further configured to select a subset of the sections for the entity extraction. For each document, the extracted entities are used to identify additional, related entities from an ontology that encodes the domain-specific data. If no additional, related entities could be identified from the ontology for at least one of the documents, the data extraction and expansion system executes a real-time search by accessing external data sources to identify and extract the additional, related entities which are then included in the set of the specific type of entities thereby expanding the set corresponding to that particular document. A matching process may then be executed between the two documents based on the expanded set of entities for each of the documents. In an example, the documents may pertain to the recruitment domain wherein one of the documents includes a candidate resume and the other document includes a job description for a position for which the candidate resume is to be matched.

While the description below may refer to one of the documents for simplicity it can be appreciated that similar processing is applied to other received documents by the system for data extraction and expansion. Furthermore, while the description details the matching process between two documents similar matching processes can be executed to determine the extent of matching from one document to many documents. The data extraction and expansion system initially performs a section segmentation process wherein the individual lines for each of the two received documents are identified as discussed herein wherein each row of text is considered as a line. Further, each line is classified into one of a heading or a non-heading/body text class. For each line that is classified as a heading, the lines following the heading line are classified as body text until a next heading line is encountered. The heading line or heading row text with the following body text can be considered as a section within the document.

The sections thus separated or individually identified are further classified into different classes. A subset of the sections is selected for further processing to extract the specific type of entities. In an example, Deep Document Understanding (DDU) features and natural language processing (NLP) features such as parts of speech (POS) tags can be employed to identify candidate text from the received documents for entity extraction. Each chunk of candidate text can be further classified into one of a plurality of entity types to form a set of the specific type of entities. The entities that are thus extracted are employed to identify further related entities of the same type from an ontology. In an example, the ontology includes nodes that represent the entities of the specific type and edges that represent the relationships between the entities. The data extraction and expansion system may also include an ontology builder that extracts data from certain domain-specific data sets to be included in the ontology. If no additional, related entities are identified from the ontology, one or more of the entities from the set of the specific type of entities can be employed as search terms to extract additional, related entities from external data sources such as online encyclopedia pages or general-purpose search engines. The additional, related entities retrieved from the external data sources can be included in the set of the specific type of entities thereby expanding the set. Therefore, two expanded entity sets each corresponding to one of the documents are thus obtained. A matching process can now be executed between the received documents based on expanded entity sets thereby improving the match between the received documents.

The data extraction and expansion system as described herein provides for technical improvement in the domain of data matching and recommendation as the data extraction and expansion system not only extracts granular information by analyzing the documents for specific entity types but also expands the set of entities with additional entities retrieved from the ontology of external data sources. Therefore, if any relevant entities were omitted from the received documents as a result of human error etc., such errors can be compensated for by the entity set expansion process. Segmenting the documents into sections and selecting specific sections enables a more granular extraction of entities. The segmenting process described herein mitigates the need for copious amounts of manually labeled training examples that need to be generated each time a new entity is introduced in the domain. Furthermore, the entity set expansion as described herein allows new entities to be extracted in real-time for domains where there may be a scarcity of available information.

When applied to the Human Resources (HR) domain, a matching system enables matching candidate resumes to job opportunities or vice versa. The first step in matching candidates' resumes and job descriptions is to extract very granular information from the documents thereby requiring extractions of different types of entities such as position titles, skills, universities, awards, and certifications, etc. Extracting such granular pieces of information using AI techniques can be challenging due to the variety of documents that may be required for processing. Processing documents for recruitment purposes can be a time-consuming and expensive process as the documents can have different languages, pertain to different areas of expertise (e.g., biomedical, construction, software development, etc.), be relevant to different geographies, different cultures, jargon, formatting norms, etc. As a result, accurate extraction of granular entities typically requires hundreds of thousands of documents to be labeled by hand. Even with accurate entity extraction, the list of skills normally specified by candidates or recruiters may be short and suboptimal. This can lead to a relevant candidate being missed or mismatched in the recruitment process. With the constant developments occurring in different domains, staying up to date with the latest skill sets can be quite difficult, especially for rare professions. The various techniques disclosed herein function to address the aforementioned challenges. Although examples are discussed herein with respect to the HR domain, section-segmentation based data extraction and expansion can be applied to other domains such as healthcare, finance, and accounting, etc., where documents such as clinical records of contracts need to be matched or processed. The section segmentation aspects discussed herein can speed up data matching processes. Furthermore, the entity set expansion as described herein improves the increases accuracy and reduces the need for training data.

FIG. 1 shows a block diagram of a data extraction and expansion system 100 in accordance with the examples disclosed herein. The data extraction and expansion system 100 receives at least two documents to be processed, e.g., a first document 124 and a second document 126, extracts a corresponding first set of entities 142, and a second set of entities 144 of a specific type from each of the at least two received documents, expands the set of entities by including additional entities obtained from external data sources such as data source 152, data source 154, etc., and executes a matching procedure to determine the extent of matching between the first document 124 and the second document 126. It can be appreciated that only two documents are shown and discussed herein by way of illustration for simplicity however, the matching procedure can be executed between one document to many documents, many documents to one document, or many to many documents. Based on the extent of matching between the documents, automatic procedures such as informing users of the extent of matching or transmitting a selection of matching documents to the users as recommendations can be executed. Furthermore, example implementation of the data extraction and expansion system 100 as a job search and matching resource is discussed herein for illustration purposes. However, the data extraction, entity expansion, and matching methods can be implemented in different domains for other purposes.

The data extraction and expansion system 100 includes a section segmentation processor 102, an entity processor 104, an expanded entity set generator 106, a document processor 108, and an ontology builder 112. The data extraction and expansion system 100 may include or may be communicatively coupled to an ontology 160 and to a data store 170 which may store data generated or used by the data extraction and expansion system 100 while executing different processes. The ontology 160 stores data regarding the specific type of entities. Although only one ontology is shown herein for simplicity, the data extraction and expansion system 100 can be communicatively coupled to different ontologies that store different types of entities that are processed by the data extraction and expansion system 100. The data extraction and expansion system 100 can also access the external data sources 152, . . . , 154, via a network such as the internet The section segmentation processor 102 accesses the first document 124 and the second document 126 and extracts the different sections a subset of the sections can be selected for further analysis for entity extraction. For example, the first document 124 can be a resume while the second document 126 can be a job description document including requirements for a position. The extraction and selection of specific sections enable the data extraction and expansion system 100 to better identify the entities of a specific type thereby extracting entities at a more granular level and in finer detail. In the example of selecting candidates for a job, the section segmentation processor 102 can be configured to extract different sections such as a personal details section, an education section, a skills section, a work experience section, etc. Such section-level identification of information is useful in identifying entities of specific types that carry greater significance for matching. For example, entities such as skills can carry greater weight than other entities for matching the resume to the job description. Accordingly, the matching procedure can focus on extracting entities such as skills from the first document 124 and the second document 126. Generally, different sections of the first document 124 and the second document can predominantly include entities of a specific type. For example, the personal details section can include entities pertaining to contact information, while the skills and work experience section can include entities pertaining to possessed by the candidate. Therefore, extraction of specific sections such as the skills and work experience sections enables more efficient and more accurate extraction of entities of a specific type thereby improving the matching process. In an example, the section segmentation processor 102 can use a combination of NLP features such as word counts, POS tags, word casings, etc. and Deep Document Understanding (DDU) for document section extraction. The entity processor 104 can process selected ones of the sections identified from the first document 124 and the second document 126 for the extraction of the specific type of entities. The entity processor 104 uses NLP features and machine learning methods to classify entities from specific sections of the first document 124 and the second document 126 for granular entity extraction. Referring to the recruitment example discussed above, specific entity types such as location entities, skill entities, organization entities, etc., can be extracted.

The expanded entity set generator 106 is configured to expand the sets of entities wherein each set of entities includes a specific type of entities, by searching for additional entities 172 from one or more of the ontology 160 or the external data sources 152, 154. The expanded entity set generator 106 leverages ML to recommend entities of the specific entity-type contained in the ontology 160 based on corresponding similarities thereby enabling better matching between the first document 124 and the second document 126. The expanded entity set generator 106 via the ontology builder 112 can also utilize the external data sources 152, 154 to continuously keep the ontology 160 updated on the latest entities that may be used in a given domain. The ontology 160 is built and updated by the ontology builder 112. During the initial analysis of the first document 124 and the second document 126 the expanded entity set generator 106 retrieves additional entities of the specific type of entities from the ontology 160 or accesses the external data sources 152, 154 upon determining no additional entities can be retrieved from the ontology. In an example, the external data sources 152, 154 can include structured data sources and unstructured data sources The document processor 108 receives the expanded entity sets for the first document 124 and the second document 126 and calculates a match score that determines the extent of match between the first document 124 and the second document 126. In an example, algorithms such as Cosine similarity or Levenshtein distance Algorithm, etc. can be used for determining the match score. Other matching procedures can be implemented to obtain the match score. Based on the extent of the match between the first document 124 and the second document 126 as indicated by the match score failing to meet, meeting or exceeding a predetermined threshold, different automatic actions may be executed. For example, an output user interface may be updated by the match scores or if the match score exceeds a predetermined threshold, one or more of the first document 124 and the second document 126 can be transmitted to users configured within the data extraction and expansion system 100.

Figure 2:
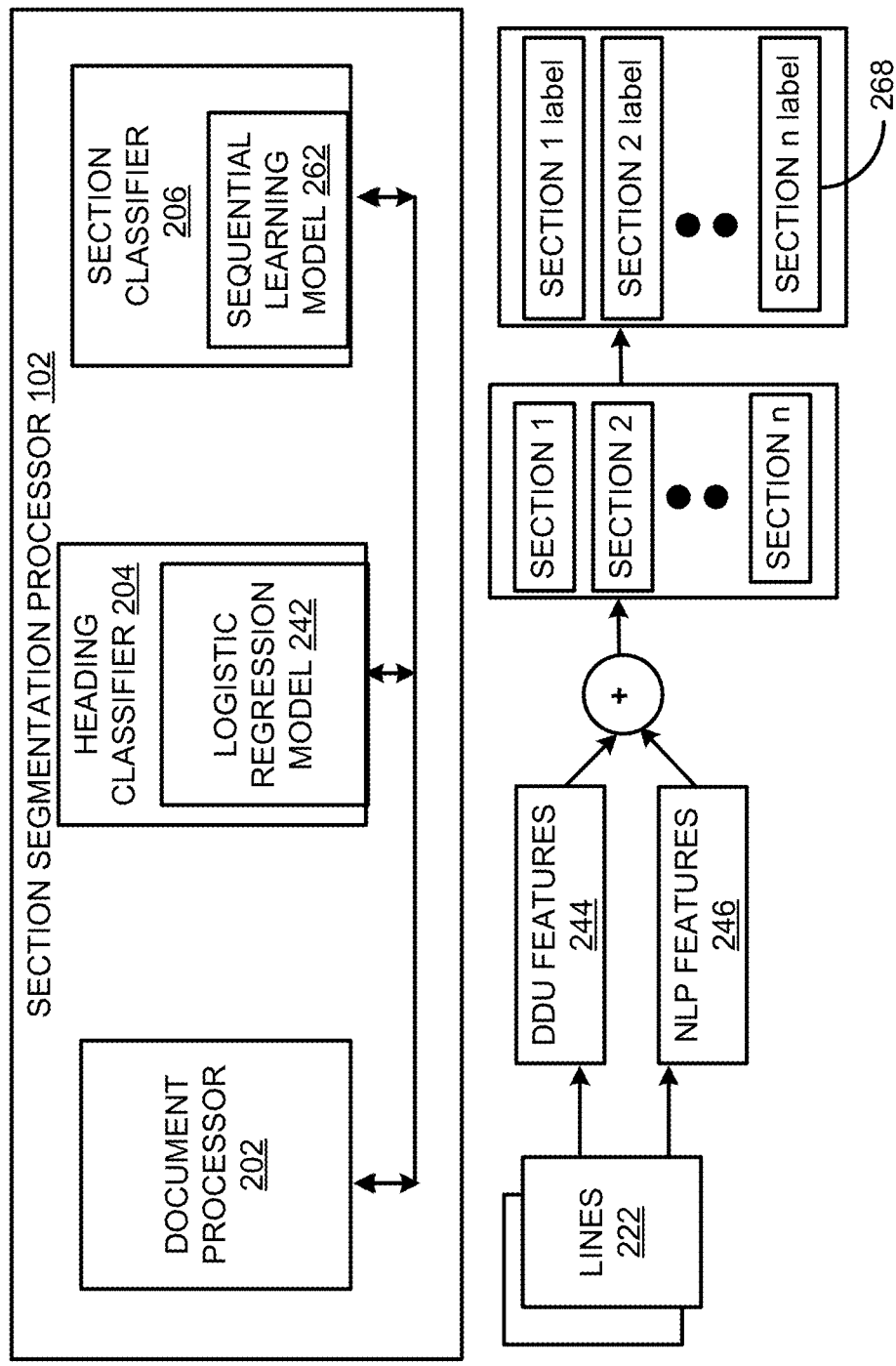
FIG. 2 shows a block diagram of a section segmentation processor in accordance with the examples disclosed herein.

FIG. 2 shows a block diagram of the section segmentation processor 102 in accordance with the examples disclosed herein. The section segmentation processor 102 includes a document processor 202, a heading classifier 204, and a section classifier 206. The document processor 202 analyzes the first document 124 and the second document 126 to split the first document 124 and the second document 126 into individual lines 222 wherein each row of text is considered as one line. If one or more of the first document 124 and the second document 126 are not searchable or machine-readable (e.g., images produced from document scanners or photographs) then the document can be converted into a machine-readable format using techniques such as optical character recognition (OCR). In an example, the document processor 202 may also function to further preprocess the first document 124 and the second document 126 such as by parsing, tokenizing, removing stop words, etc.

Documents are generally made up of sections or subsections and include the corresponding headings and subheadings. Therefore, the individual lines 222 are provided to the heading classifier 204 for the classification into one of the heading and a non-heading class or body text class. In an example, the heading classifier 204 can include logistic regression model 242. The heading classifier 204 can employ DDU features 244 such as but not limited to the text format i.e., whether the text is bold/italicized/underlined, etc., the position coordinates of the text within the document, the font properties and the font sizes of the text, the line number in the document, etc. Also, NLP features 246 such as but not limited to, the number of words in a line, the number of words in a line with POS tags (e.g., noun, verb, adjective, adverb, etc.), the number of punctuations in the line, etc., the number of words in a line beginning with uppercase, etc. The consecutive lines following each heading and before the occurrence of the next heading are combined to form the body text which is identified as a separate section e.g. section 1, section 2, . . . section n. The heading classifier 204, therefore, enables identifying section boundaries presuming that sections are separated by a heading.

The section classifier 206 accesses each portion of body text identified as a separate section to classify the sections into different classes by employing different features of the tokens (i.e., token-wise features) generated from the first document 124 and the second document 126. By way of illustration and not limitation, the features extracted from the body text can include:

token: token itself
isUpper: 1 if the token is in upper case else 0
isTitle: 1 if the token is a title else 0
isDigit: 1 if the token is a digit else 0
isAlphanum: 1 if the token is in alphanumeric form else 0
isAlpha: 1 if the token is an alphabetical character else 0
isHead: 1 if the token is part of a section heading else 0
sectionNo: the number assigned to the corresponding section of the token. Section number is assigned based on the sequential order of the section
characterEncoding: encodes the properties of each character in the token. The considered properties are i) the character is an alphabetical character and in upper case, ii)

the character is an alphabetical character and in lower case, iii) the character is a digit, iv) the character is a punctuation symbol: the name of the token if it's not a word. For example, 'Comma', 'Semicolon', etc.

repeatedSymbolFeature: checks whether symbols are repeated tokenLength: length of token 1 if the token is a * else 0

In an example, the section classifier 206 can include a sequential learning model such as conditional random field (CRF) model or Hidden Markov model (HMM) 262. The features listed above are input to the sequential learning model 262 in a successive manner (i.e., in the same order in which the tokens were presented in the first document 124 and the second document 126). Also, section boundaries can also be used as features by the sequential learning model 262. The sequential learning model 262 is configured to predict the class label of each token. The class labels of the tokens for a given section are recorded and the label which is predicted for the maximum number of tokens is predicted as the target label of that section e.g., such as the section label 268. Referring to the recruitment example above, if one of the first document 124 and the second document 126 includes a resume, the section classifier 206 can classify or extract sections such as the personal details section, education section, experience section, skill section, etc.

Figure 3:
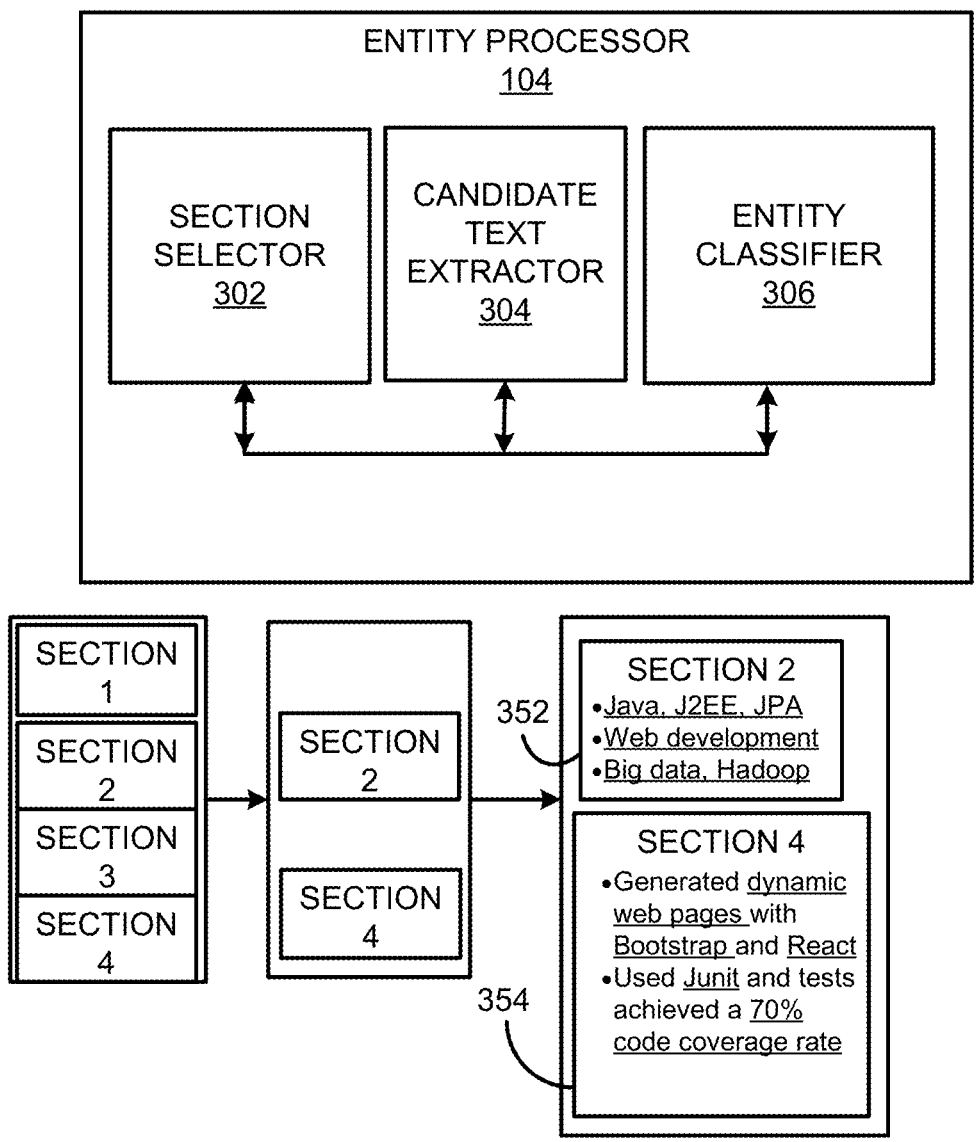
FIG. 3 shows a block diagram of an entity processor in accordance with the examples disclosed herein.

FIG. 3 shows a block diagram of the entity processor 104 in accordance with the examples disclosed herein. The entity processor 104 includes a section selector 302, a candidate text extractor 304, and an entity classifier 306. The section selector 302 is configured to identify sections of interest-based on the entity type to be extracted. For example, if one of the first document 124 and the second document 126 includes four sections then the section selector 302 may select only two sections, e.g., section 2 and section 4 for further processing, and other sections are discarded from consideration. This is because the specific type of entity that is to be extracted may not be typically present in section 1 and section 3. In an example, the section selection can be executed based on rules that specify keywords and other criteria corresponding to the particular section labels that are output by the section classifier 206. Referring again to the recruitment example discussed above, if entities of "skill" type are to be extracted from the candidate resume, the personal details section, and the education section may be eliminated while the skills section and the work experience section are selected for further processing. The selective section processing as disclosed herein decreases the processing load while improving the processing speed.

The candidate text extractor 304 accesses at least a subset of the NLP features 246 such as POS tags to identify and select candidate text from the selected sections for entity extraction. For example, noun phrases throughout the selected sections may be identified and filtered. Example candidate texts 352, 354 selected for entity extraction are shown. The entity classifier 306 classifies each of the chunks of the candidate text 352, 354 as one of a specific entity type or not of the specific entity type. Alternately, the chunks including the text of the specific entity type are identified by the entity classifier 306. In an example the entity classifier 306 can include trained information extraction models such as but not limited to, CRF, Bidirectional Long Short Term Memory CRF (BiLSTM-CRF), Bidirectional Encoder Representations from Transformers (BERT), etc. for identifying the specific type of entity. Referring to the HR or recruitment domain, entities can be classified into skill or non-skill entity types. For example, the filtered noun phrases in the selected candidate text 352 are all of skill entity type, e.g., Java, J2EE, JPA, Web development, Big data, Hadoop, etc., whereas the selected candidate text 354 from section 4 includes nouns such as 'dynamic web pages' or 'code coverage rate' which are not of skill entity types. Although these noun phrases may have been part of the selected candidate text, they are not selected as skill entity type by the entity classifier 306.

Figure 4:
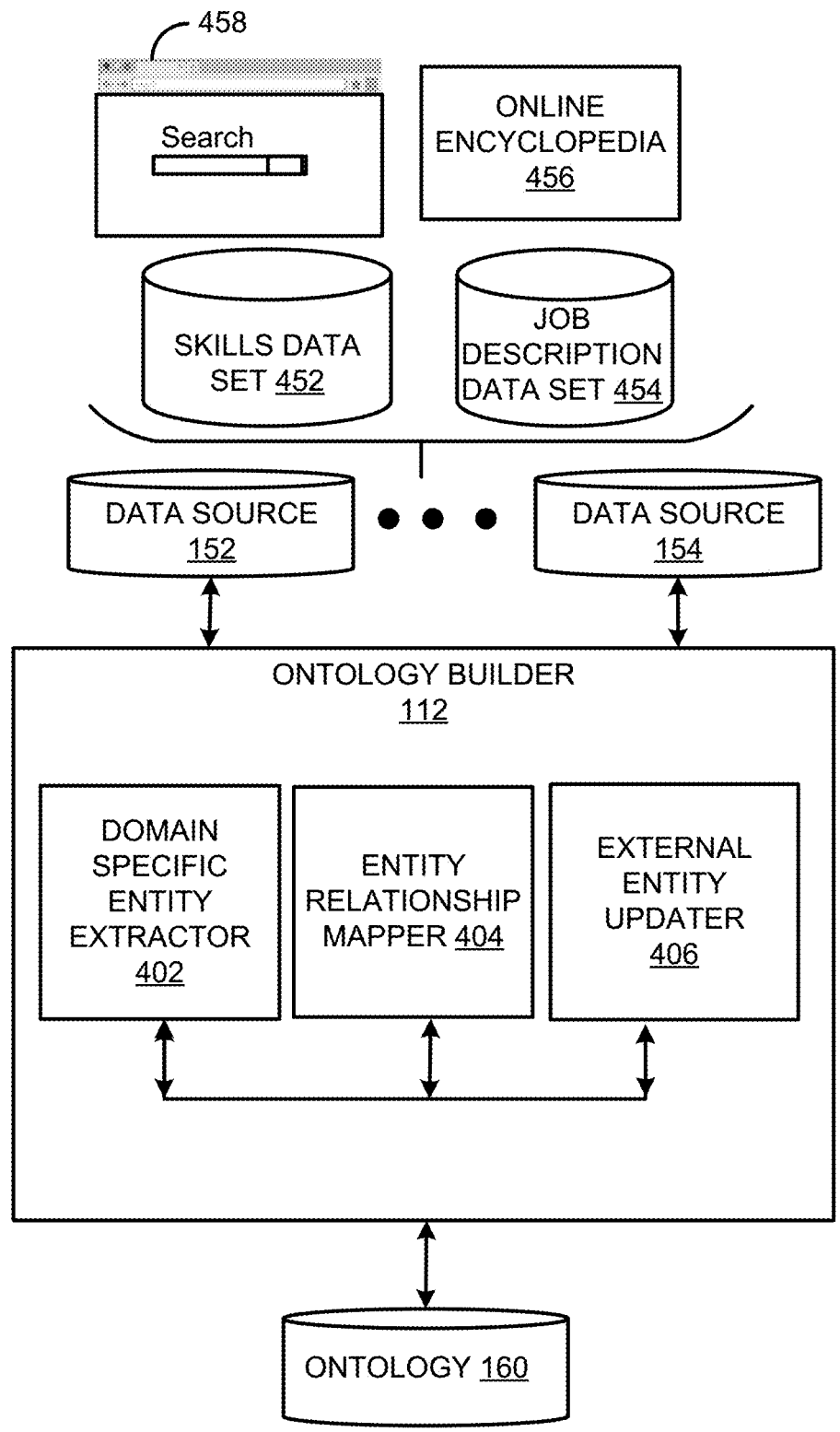
FIG. 4 shows a block of an ontology builder in accordance with the examples disclosed herein.

FIG. 4 shows a block of the ontology builder 112 in accordance with the examples disclosed herein. The ontology 160 stores data regarding the specific type of entity to be extracted and used for matching the first document 124 and the second document 126. The below discussion illustrates how an ontology storing data related to job skills can be constructed. It can be appreciated that the techniques for building an ontology as discussed herein can similarly be applied in other domains for building ontologies that may store data regarding other domain-specific entities. The ontology builder 112 includes a domain-specific entity extractor 402, an entity-relationship mapper 404, and an external entity updater 406. Turning again to the recruitment example, the external data sources 152 . . . 154 can include certain domain-specific entity data repositories such as but not limited to a skill data set 452 and a job description data set 454 in addition to repositories of unstructured data such as an online encyclopedia 456 e.g., Wikipedia and the internet search engines 458.

The skill data set 452 includes different types of job skills that in use in a particular domain e.g., the software domain and the job description data set 454 includes data regarding the different job roles and the corresponding skills required by each of the job roles in the particular domain. The skills for each job role in the job description dataset 454 can be extracted using the entity processor 104. In an example, the skill data set 452 and the job description data set 454 can include structured data. The domain-specific entity extractor 402 may employ the skills extracted from the skills data set 452 and the job description data set 454 to construct the ontology 160. The entity-relationship mapper 404 accesses the information regarding the skills and the job roles extracted by the domain-specific entity extractor 402 to establish mappings between related skills. For instance, two skills are identified as related and are mapped accordingly within the ontology 160 when both the skills are required for the same job role. In an example, the ontology 160 can include a knowledge graph wherein the related skills form the nodes while the relationships between the skills form the edges of the knowledge graph.

In addition to extracting entities from the domain-specific repositories, the ontology builder 112 also includes the external entity updater 406 that is configured to extract new entities of the specific type from the external data sources 152, . . . 154 such as online encyclopedia pages or results of a search engine. The external entity updater 406 employs existing entities from the ontology 160 as queries to search for related new entities from the external data sources 152, . . . 154. For example, online encyclopedia pages (webpages with links) that are retrieved in response to the execution of the entity queries. The online encyclopedia pages can include links to other online encyclopedia pages or webpages. The external entity updater 406 can be configured to identify noun phrases within the link text. The vector representations generated for the noun phrases are compared with the vector representations of the entities in the ontology 160 to identify all the entities from the ontology 160 that may be related to the noun phrases. The noun-phrases form the nodes and the relationships with the related entities and form the edges of the knowledge graph in the ontology 160.

The webpages that are retrieved from the external data sources 152, . . . 154 can be parsed, tokenized, and tagged with POS data to identify the noun phrases. The extracted tokens can be matched against the entities extracted from the first document 124 and the second document 126 for a preliminary ranking so that the top K webpages (wherein K is a natural number and K=1, 2, 3, . . . ) can be selected for further processing. Again, the vector representations are constructed from the noun phrases from the top K webpages and the similarity with the existing entities within the ontology 160 are determined to add new nodes and edges to the knowledge graph. Constructing vector representations enables the ontology builder 112 to better identify similar entities while eliminating noisy input. In an example, tools such as term frequency-inverse document frequency (TF-IDF), Skill2Vec or pre-trained word embedding (e.g., Word2Vec or BERT) can be used to build the vector representations. In an example, wherein Skill2Vec module is used, the skills from the skills dataset 452 (e.g., O*Net) are grouped by each unique job title to create a training dataset for training a semantic embedding model. The semantic embedding model is used to generate the mathematical vectors for individual skills.

Figure 5:
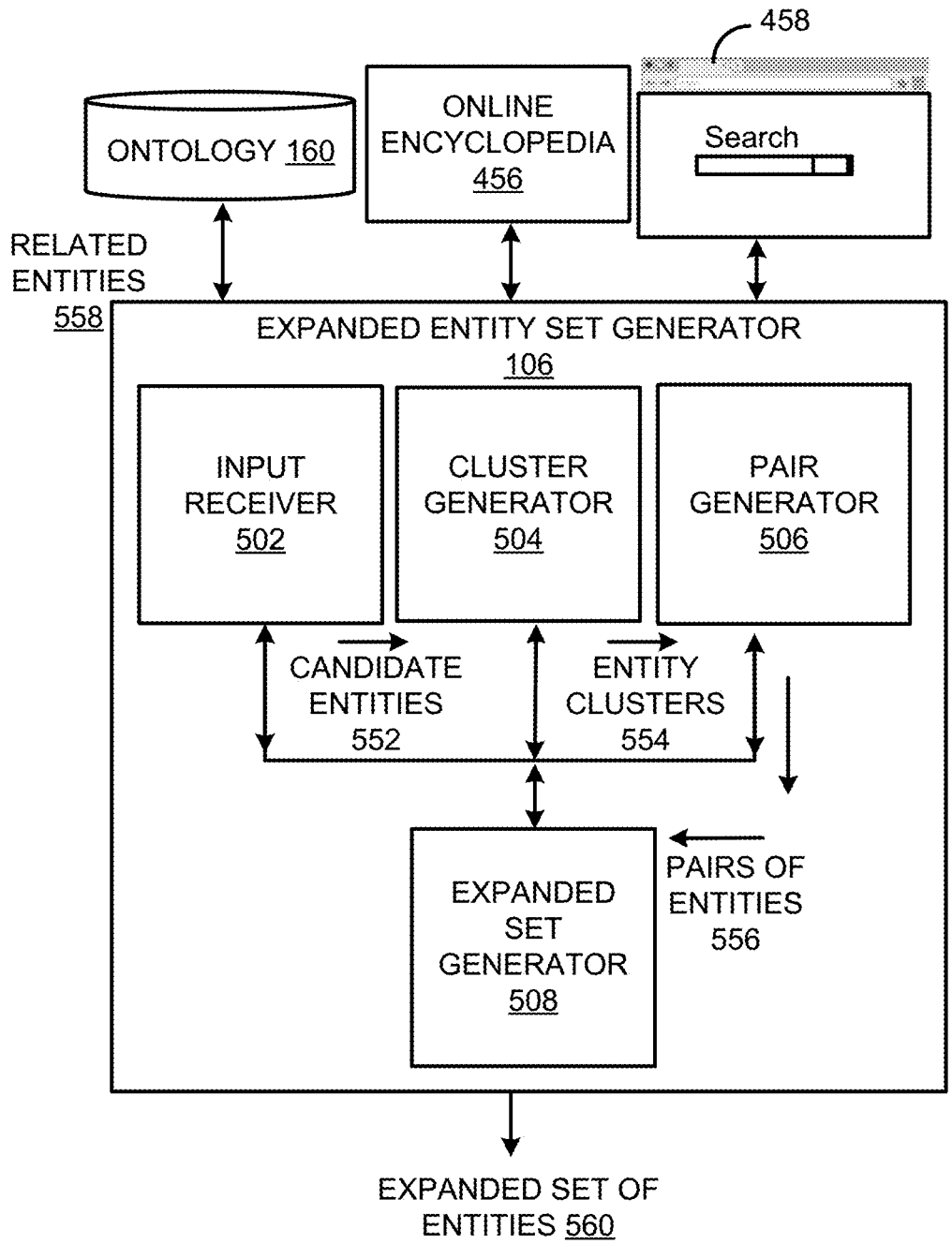
FIG. 5 shows a block diagram of an expanded entity set generator in accordance with the examples disclosed herein.

FIG. 5 shows a block diagram of the expanded entity set generator 106 in accordance with the examples disclosed herein. The ontology 160 when applied in the context of the resume and the job requirements improves the probability of a match as the skills of the candidate are improved via skill set expansion. If the set of the specific type of entities could not be expanded as no related entities could be found in the ontology 160, further extension of the set of a specific entity type or the skill set is possible via the expanded entity set generator 106 which initiates the new search for related entities via networks such as the Internet. The expanded entity set generator 106 also employs external data sources such as the online encyclopedia pages 456 and the Internet search engines 458 identification of additional, new entities, e.g., related skills. The expanded entity set generator 106 includes an input receiver 502, a cluster generator 504, a pair generator 506, and an expanded set generator 508. The input receiver 502 receives one or more of the first set of entities 142 and the second set of entities 144 identified respectively from the first document 124 and the second document 126 for conducting a search of the external data sources such as but not limited to the online encyclopedia pages 456 and the Internet search engines 458 for extracting candidate entities 552 of the specific entity type. In an example, the top K matches (wherein K is a natural number) from several results obtained from conducting the search on an internet search engine and online encyclopedia pages can be selected for further processing. The cluster generator 504 generates entity vectors from the received entities (i.e., the top K matches) and the extracted candidate entities 552 and clusters the entity vectors thus generating entity clusters 554 based on corresponding similarities. In an example, the cluster generator 504 can employ techniques such as K-means clustering or spectral clustering, etc., for generating the entity clusters. The pair generator 506 generates pairs of entities 556 from the entity clusters wherein each entity from each of the entity clusters 554 is a paired with other entities from same entity cluster. The expanded set generator 508 identifies for each of the individual entities from each of the pairs of entities 556, the related entities 558 from the ontology 160. The intersection of entities or entities from the related entities 558 that are common to both the entities in each of the pairs of entities 556 are added to an expanded set of entities 560. The expanded set of entities 560 is employed by the document processor 108 to identify or determine the extent of matching between the first document 124 and the second document 124.

Figure 6:
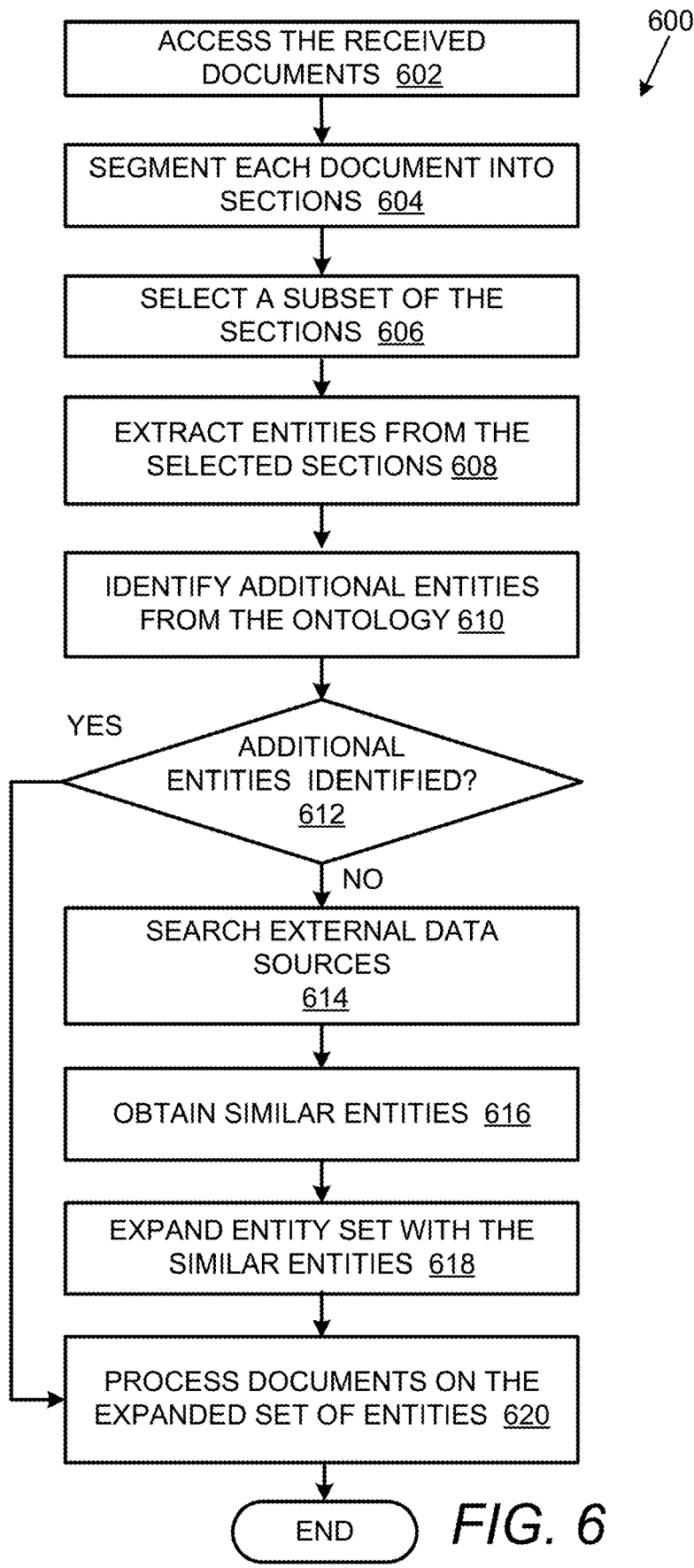
FIG. 6 shows a flowchart that details a method of processing received documents in accordance with examples disclosed herein.

FIG. 6 shows a flowchart 600 that details a method of processing received documents in accordance with examples disclosed herein. The method begins at 602 wherein the first document 124 and the second document 126 are received. In an example, the first document 124 and the second document 126 may each have one or more sections separated by section headings. The individual sections are extracted at 604 from the first document 124 and the second document 124. A subset of the extracted sections is selected for further processing at 606 based on the specific type of entities to be extracted from the first document 124 and the second document 126. The specific type of entities are extracted from the selected sections at 608. The additional entities 172 similar to the specific type of entities are identified for extraction at 610 from the ontology 160. It is determined at 612 if additional entities were identified from the ontology 160. If it is determined at 612 that additional entities 172 were identified from the ontology 160, the method moves to 618 to expand the set of the specific type of entities by including the additional entities 172 into the set of entities. The first document 124 and the second document 126 are processed based on the expanded set of entities 620.

If at 612, it is determined that additional entities were not identified from the ontology 160, the method moves to 614 to search one or more of the external data sources 152, . . . 154, for additional entities. In an example, the external data sources 152, . . . 154, that are searched can include online encyclopedia pages or results of searches conducted using Internet search engines. At 616, entities that are similar to the specific type of entities are obtained from the external data sources 152, . . . 154. The entities in the external data sources 152, . . . 154, are added to the set of the specific type of entities to expand the entity set at 618 and a match score, ranking, or recommendation between the first document 124 and the second document 126 may be obtained at 620 based on the expanded set of entities.

Figure 7:
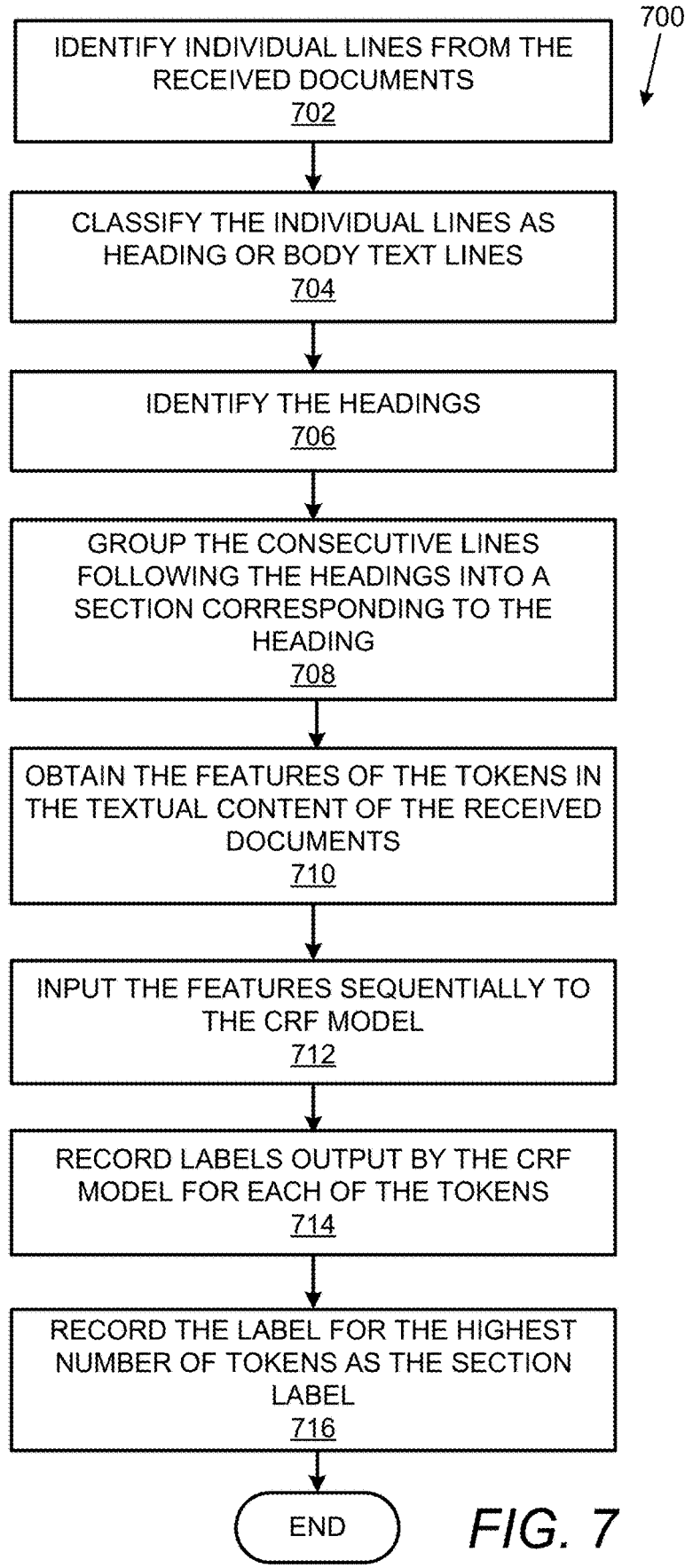
FIG. 7 shows a flowchart that details a method of extracting sections from the documents in accordance with the examples disclosed herein.

FIG. 7 shows a flowchart 700 that details a method of extracting and classifying sections from the documents in accordance with the examples disclosed herein. The method begins at 702 wherein individual lines are identified from the textual content included in the first document 124 and the second document 126. Techniques such as OCR may be initially applied to the first document 124 and the second document 126 to identify the individual lines. At 704 each of the individual lines is classified as one of heading or body text using the ML models such as a logistic regression classifier. Various features such as DDU features 244 and NLP features such as 246 of the first document 124 and the second document 126 enable classification of the individual lines. Therefore, the headings are identified at 706 which enables identifying the section boundaries as the consecutive lines following the headings are grouped into a section corresponding to the headings at 708. The features of each of the tokens in the textual content of each of the identified sections are obtained at 710. The features for each of the identified sections are input at 712 to the sequential learning model 262 in a sequential manner that follows the same sequence in which the tokens were present in the identified sections. The labels output by the sequential learning model 262 for each of the tokens are recorded for each of the sections at 714. The label predicted for the maximum number of tokens for a given section is recorded as the target label of that section at 716.

Figure 8:
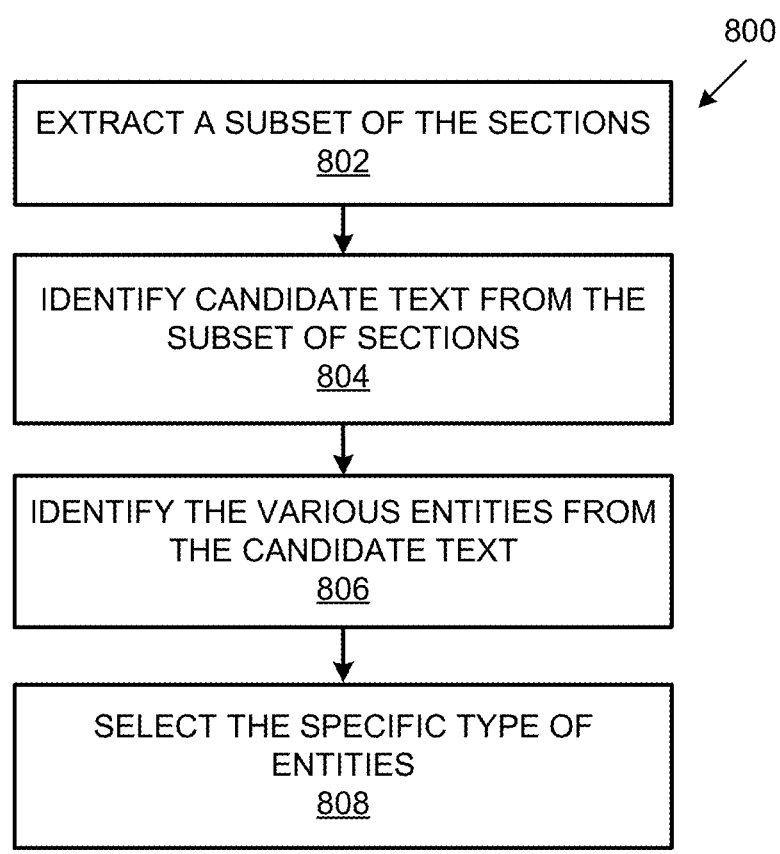
FIG. 8 shows a flowchart that details a method of extracting a set of the specific type of entities in accordance with the examples disclosed herein.

FIG. 8 shows a flowchart 800 that details a method of extracting a set of the specific type of entities from the received documents per the examples disclosed herein. The method commences at 802 wherein a subset of the extracted sections is selected for further processing. The data extraction and expansion system 100 can be configured with specific keywords to identify particular sections that may include the specific type of entities. At 804 NLP features such as POS tags and more specifically, noun phrases, can be employed to identify candidate text from the selected sections for entity extraction. Various entities are identified from the candidate text at 806. At 808, the entity classifier 306 is configured to select the specific type of entities from the various entities identified at 806.

Figure 9:
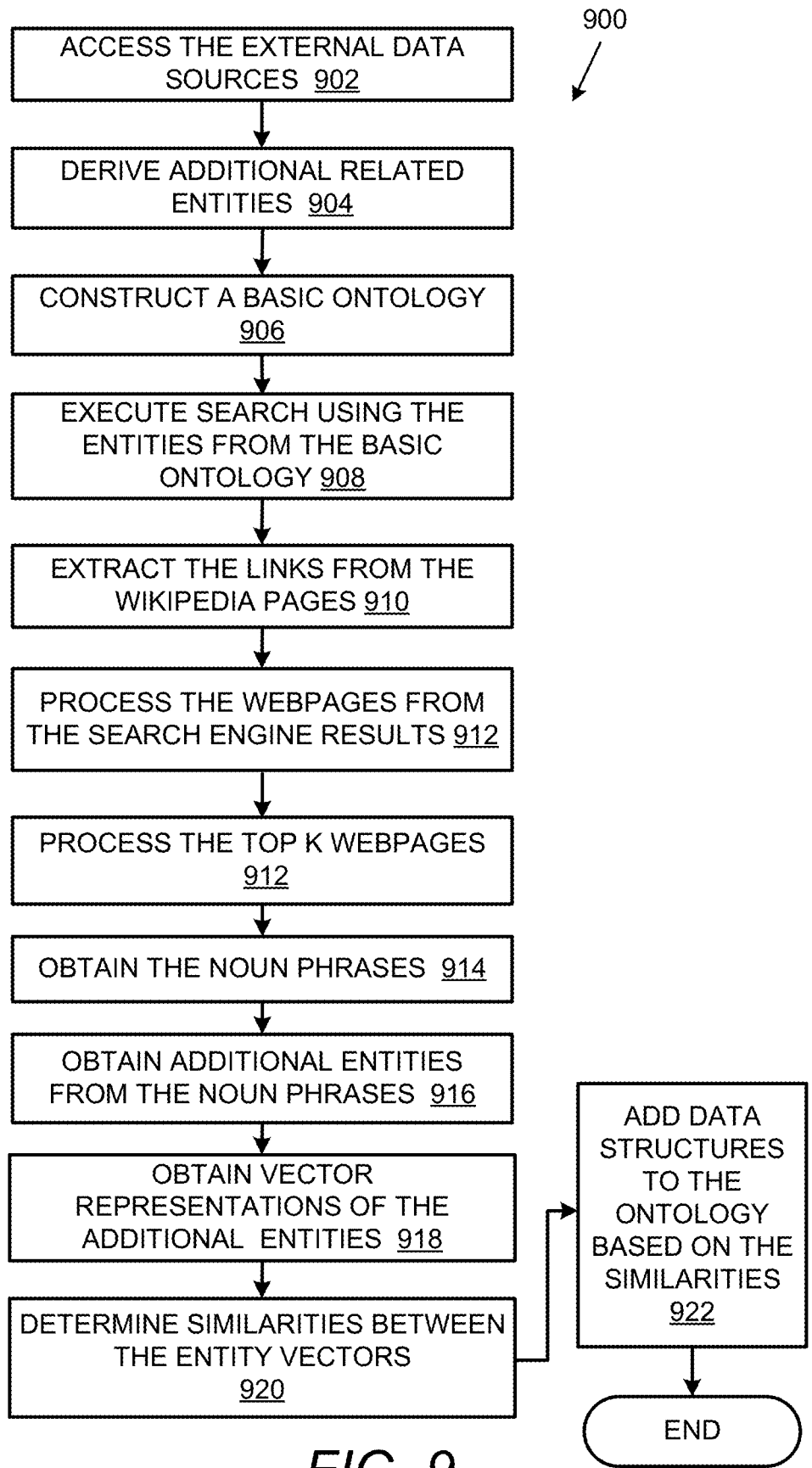
FIG. 9 shows a flowchart that details a method of building the ontology 160 in accordance with the examples disclosed herein.

FIG. 9 shows a flowchart 900 that details a method of building the ontology 160 in accordance with the examples disclosed herein. The method begins at 902 with accessing the external data sources 152, . . . , 154, which can include certain domain-specific data sets such as the skills data set 452 e.g., O*Net and job description data set 454. At 904, additional entities that are related to the entities derived from the first document 124 and the second document 126 are obtained from the domain-specific data sets. The additional entities obtained from the domain-specific data sets can be initially used to construct a basic ontology at 906 wherein the skills form the notes and the relationships between the skills form the edges of data structures such as knowledge maps stored in the basic ontology. Furthermore, the entities obtained from the domain-specific data sets can be used as search terms at 908 to execute searches and obtain other related entities from the data sources such as the online encyclopedia pages 456 and the Internet search engines. While the domain-specific data sets include structured data other external data sources such as online encyclopedia pages 456 or the results from the search engines include unstructured data that needs to be further processed for extraction of further additional entities.

At 910, the links from the online encyclopedia pages 456 are extracted. Also, the webpages corresponding to the top K (wherein K is a natural number and K=1, 2, 3 . . . ) search results are processed at 912 for tokenizing and POS tagging. Based on the POS tags, the noun phrases are obtained at 914 from the phrases identified from the online encyclopedia links and top K webpage data. The noun phrases provided to the entity classifier 306 at 916 to obtain the additional entities. At 918 the vector representations of the additional entities are obtained. The similarities are determined 920 between the entity vectors obtained from the basic ontology and the entity vectors corresponding to the additional entities obtained from the online encyclopedia and the webpage data. The data structures within the ontology 160 are added at 922 based on the similarities so that the additional entities obtained from the online encyclopedia links and top K webpage data are added as nodes and the relationships between the similar entities as edges to the knowledge graphs.

Figure 10:
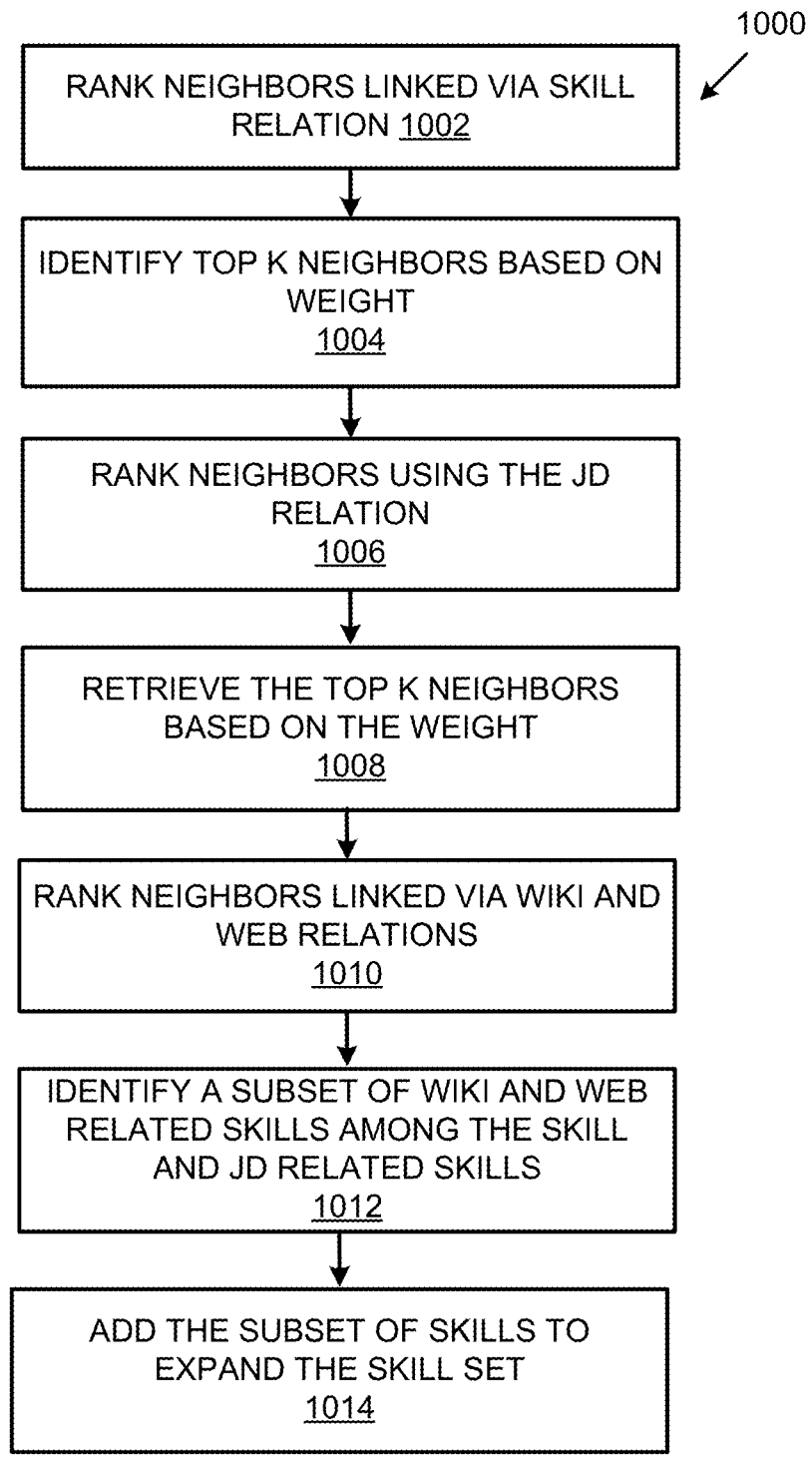
FIG. 10 shows a method of identifying similar entities such as similar skills from the ontology in accordance with examples disclosed herein.

FIG. 10 shows a method of identifying similar entities such as similar skills from the ontology 160 in accordance with examples disclosed herein. Although the below method is discussed in the context of recruitment it can be appreciated that similar methods can be implemented in other domains using techniques disclosed herein. The method begins at 1002 with ranking neighbors that are linked in the ontology 160 using a skill relation. For example, two skills are identified as related if both the skills are listed under the same job description in the job description data set 454. The top K entities or neighbors based on weight are identified at 1004 from the ontology 160. At 1006, the neighbors that are linked using job description (JD) relation are ranked. The relationships between the skills listed in each of the various sections in the second document 126 which includes job descriptions are linked in the ontology 160 under the JD relations. The top K neighbors based on weights are retrieved at 1008. At 1010, the neighbors that are linked in the ontology 160 using Wiki and Web relations are ranked. For each skill (e.g., s) in the basic ontology, the corresponding online encyclopedia concept (e.g., w) is identified in the search for additional skills. The skills that are linked to w in the online encyclopedia are chosen as the candidate skills (e.g., C) to be connected to s in the ontology 160. Relations are added between s and the skills filtered from the candidate skills C in the ontology 160. BERT similarity score is used for skill filtering. This relation is called Wiki relation. As mentioned above, skills in the basic ontology are used as queries in the search engine and obtain top-k web pages. The skill phrases in the web pages are identified using the entity classifier 306 which is trained using skill dataset 452 and these skill phrases are considered as candidate skills. Relations are added between s and the skills filtered from the candidate skills C in the ontology 160. This relation is called Web relation. At 1012, among the set of skills related in the ontology 160 via skill relations and job description relations, a subset of skills that are also linked via the wiki relations and web relations are identified. The subset of skills that are thus identified is added to the original skills extracted from the received first document 124 and the received second document 126 to expand the skill set at 1014.

Figure 11A:
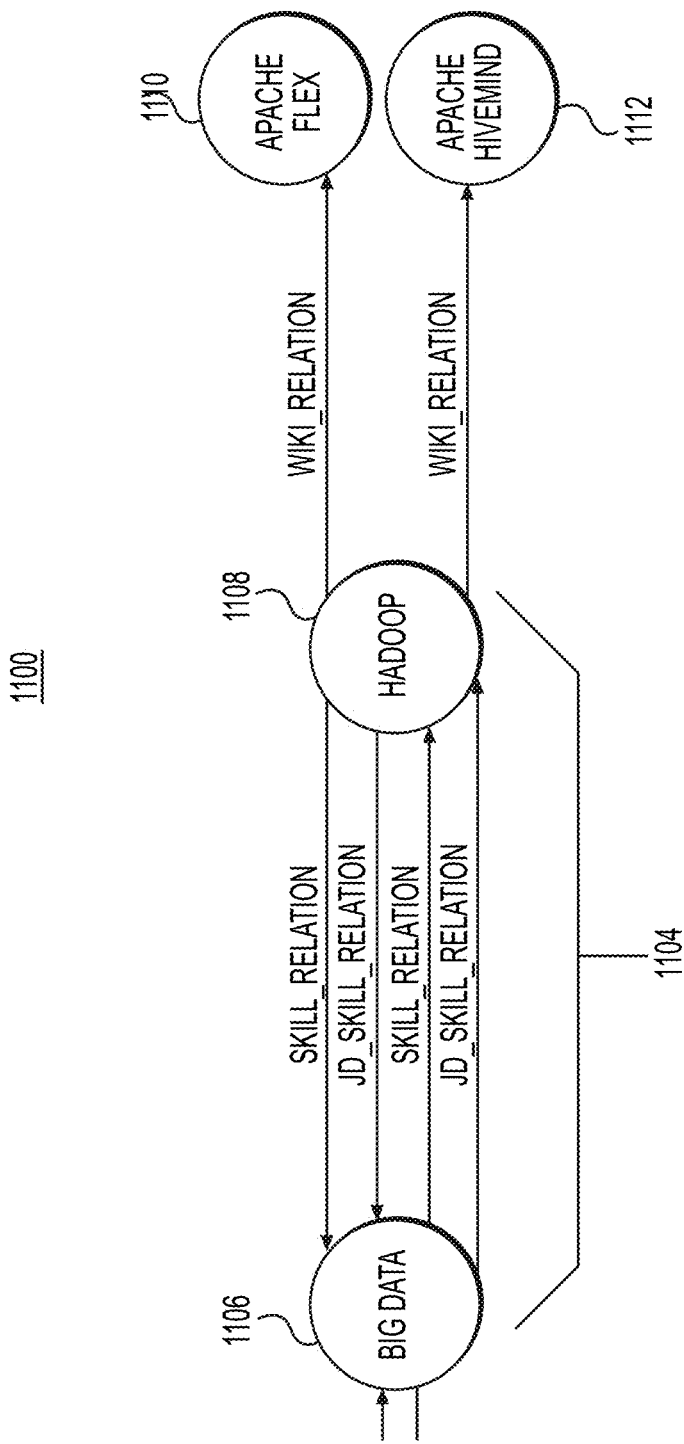
FIG. 11A shows an example ontology that is constructed in accordance with the examples disclosed herein.

FIG. 11A shows an example ontology that is constructed in accordance with the examples disclosed herein. The example ontology 1100 pertains to the recruitment domain and shows related skills. More particularly, a knowledge graph structure is shown with basic ontology 1104 that includes skill nodes 1106 and 1108 with skills as extracted from the skills data set 452, and the job description data set 454. Accordingly, multiple relations including skill relations and JD relations connect the two skill nodes 1106 and 1108. Additional skill nodes 1110 and 1112 extending the basic ontology are incorporated with the additional skills derived from the data sources such as the online encyclopedia pages or the search engine results.

FIG. 11B shows an example document 1150 with the sections and the candidate text for entity extraction identified in accordance with the examples disclosed herein. The document 1150 has various sections starting with the contact information section 1152 with the as a heading, the education section 1154, the technical skills section 1156, the work experience section 1158, the projects section 1160. Each of the sections has a corresponding heading. Candidate texts for skill entity extraction include the textual content under the technical skill section and other phrases extracted from the work experience section 1158 and the projects section 1160 such as Matlab, API, SQL, Python, local outlier factor (LOF) algorithm, MapReduce, React, Bootstrap, RESTful API, Swagger, API Gateway, Junit, Django, etc.

Figure 12:
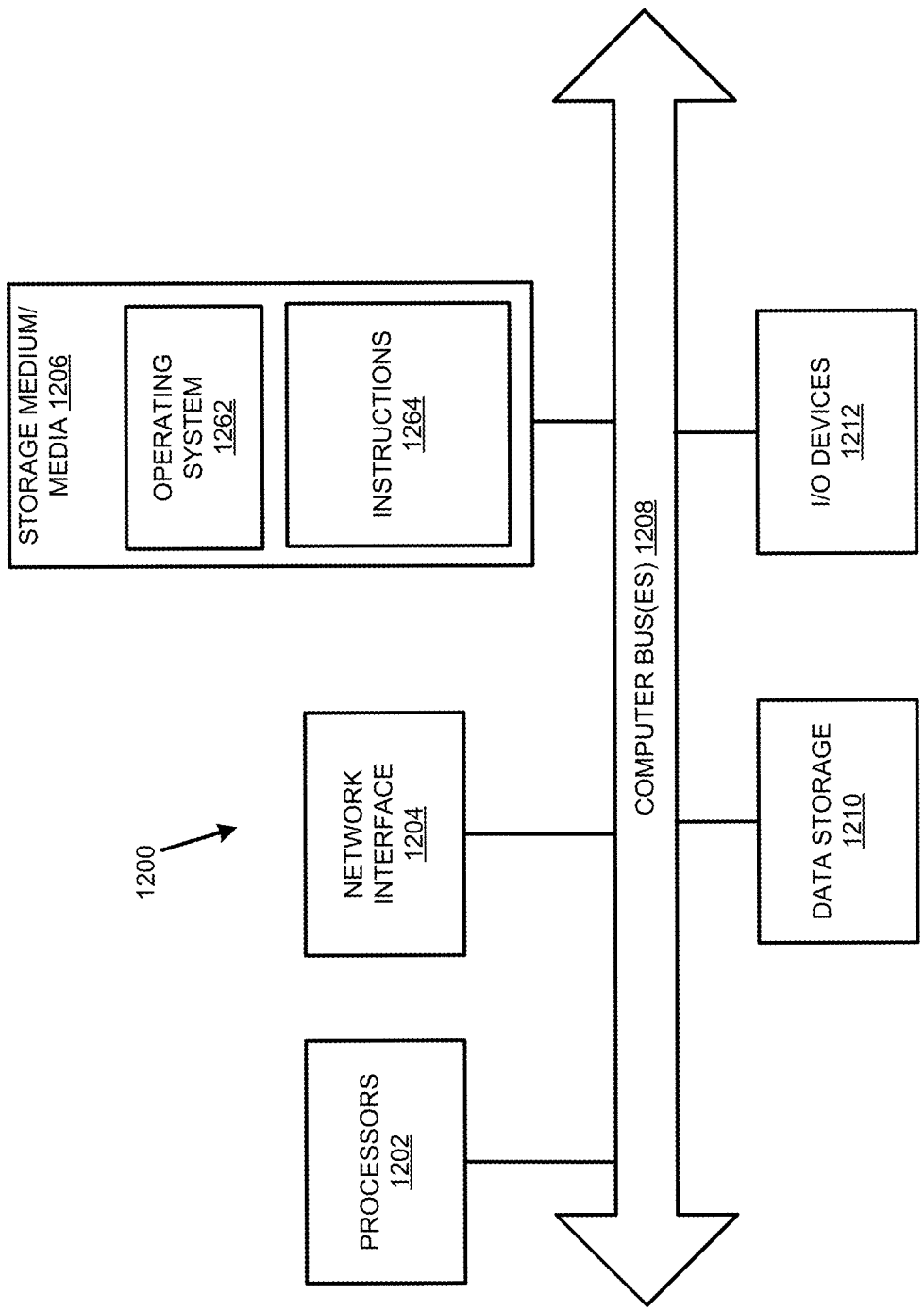
FIG. 12 illustrates a computer system that may be used to implement the data extraction and expansion system.

FIG. 12 illustrates a computer system 1200 that may be used to implement the data extraction and expansion system 100. More particularly, computing machines such as desktops, laptops, smartphones, tablets, and wearables which may be used to generate or access the data from the data extraction and expansion system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processor(s) 1202 to perform the methods and functions of the data extraction and expansion system 100.

The data extraction and expansion system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the data extraction and expansion system 100. The operating system 1262 may be multi-user, multiprocessing, multitasking, multithreading, real-time, and the like. For example, during runtime, the operating system 1262 is running and the code for the data extraction and expansion system 100 is executed by the processor(s) 1202.

The computer system 1200 may include a data storage 1210, which may include non-volatile data storage. The data storage 1210 stores any data used by the data extraction and expansion system 100. The data storage 1210 may be used to store the extracted entities, the additional entities, the document processor outputs, and other data that is used or generated by the data extraction and expansion system 100 during the course of operation.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A data extraction and expansion system, comprising:
   at least one processor;
   a non-transitory processor readable medium storing machine-readable instructions that cause the processor to:
   extract individual sections from at least two received documents that include textual content;
   select a subset of the individual sections for entity extraction;
   extract chunks of candidate text from the textual content as entities of a specific type;
   access external data sources for additional entities upon determining that the additional entities are not included in an ontology that includes data related to the specific type of entities wherein the external data sources include webpages including links with link text and results from a search engine;
   identify as the additional entities, top K entities similar to the specific type of entities extracted from the at least two received documents, wherein the top k entities are identified from filtered noun phrases of the link text and the results of the search engine and K is a natural number;
   expand a set of the specific type of entities associated with the at least two received documents by including the top K entities along with the specific types of entities extracted from the at least two received documents; and
   execute automatic actions using the expanded set of the specific type of entities.

2. The data extraction and expansion system of claim 1, wherein to execute the automatic actions the processor is to further:
   obtain a match score between the at least two received documents based on entity similarities between the expanded set of the specific type of entities associated with each of the at least two received documents, wherein the match score indicates an extent of match between the at least two received documents; and
   execute the automatic actions in response to the match score exceeding a predetermined threshold.

3. The data extraction and expansion system of claim 1, wherein to extract the individual sections the processor is to:
   split each of the at least two received documents into individual rows of text;
   classify each of the rows of text into one of a heading text or body text class; and
   identify each set of consecutive rows of text occurring between a heading row text and a next consecutive heading row text and classified into the body text class as a section.

4. The data extraction and expansion system of claim 1, wherein to select the subset of the individual sections the processor is to:
   select the subset of the individual sections based on rules that specify the individual sections to be selected based on the specific type of entities.

5. The data extraction and expansion system of claim 4, wherein to extract the entities of the specific type the processor is to:
   identify the candidate text for entity extraction based on parts of speech (POS) tags associated with the candidate text.

6. The data extraction and expansion system of claim 5, wherein to extract the entities of the specific type the processor is to:
   classify the chunks of candidate text into different types of entities using an entity classifier.

7. The data extraction and expansion system of claim 1, wherein to expand the set of the specific type of entities the processor is to:
   build entity vectors from the specific type of entities and the filtered noun phrases; and
   generate clusters of the entity vectors based on corresponding similarities.

8. The data extraction and expansion system of claim 7, wherein to expand the set of the specific type of entities the processor is to:
form pairs of the entity vectors from the entity vectors that belong to a cluster.

9. The data extraction and expansion system of claim 8, wherein to expand the set of the specific type of entities the processor is to:
for each of the entities in each of the entity vector pairs, identify related entities from the ontology; and
obtain an intersection of the related entities.

10. The data extraction and expansion system of claim 9, wherein to expand the set of the specific type of entities the processor is to:
add the related entities from each intersection to the expanded set of the specific type of entities.

11. The data extraction and expansion system of claim 1, wherein the at least two received documents include a job description document and a candidate resume.

12. The data extraction and expansion system of claim 1, wherein the specific type of entities include skill entities.

13. A method of extracting information and extracting data comprising:
receiving at least two documents with data to be processed, the data in the at least two received documents include domain-specific data formatted into one or more sections with section headings;
identifying individual sections from the at least two received documents wherein each section includes a heading followed by related textual content;
selecting a subset of the sections for further processing based on a specific type of entities to be extracted, wherein the specific type of entity to be extracted depends on the type of data to be processed;
extracting a set of the specific type of entities from the subset of sections;
expanding the set of the specific type of entities, wherein the expansion of the specific type of entities includes:
determining if related, additional entities of the specific type can be identified from an ontology that includes information pertaining to the domain,
wherein, if the additional entities of the specific type are identified from the ontology, then:
extracting the additional entities from the ontology, and
expanding the set of the specific type of entities by including the additional entities retrieved from the ontology to the set of the specific type of entities; and
wherein, if the additional entities of the specific type cannot be identified from the ontology, then:
executing a search for the additional entities using the specific type of entities as search terms, wherein the search is conducted using one or more domain-specific databases and one or more external data sources;
including the additional entities to the set of the specific type of entities; and
executing automatic actions using the set of the specific type of entities expanded to include the additional entities.

14. The method of claim 13, wherein identifying the individual sections includes:
extracting individual lines of the textual content from the at least two received documents; and
classifying each of the lines into one of a heading or a body text.

15. The method of claim 13, wherein selecting the subset of the sections for further processing further includes:
parsing and tokenizing the textual content; and
providing token-wise features to a sequential learning model in a sequential order that follows an occurrence sequence of tokens in the textual content;
recording different labels pertaining to one of different classes of sections for each of the tokens; and
classifying each section of the sections into one of the different classes of sections based on a label recorded for a maximum number of tokens for the section.

16. The method of claim 13, wherein expanding the set of the specific type of entities by executing the search further includes:
selecting the additional entities as top K matches (wherein K is a natural number) from a number of results obtained from conducting the search as on an internet search engine and online encyclopedia pages.

17. The method of claim 16, wherein expanding the set of the specific type of entities further comprises:
clustering the set of the specific type of entities and the additional entities into a plurality of clusters;
forming pairs of entities from entities in each of the plurality of clusters; and
for each entity in each of the pairs of entities, retrieving related entities from the ontology.

18. The method of claim 17, wherein expanding the set of the specific type of entities further comprises:
for each of the pairs of entities,
identifying the related entities retrieved from the ontology that are common to both entities in the pair of entities;
and
adding the related entities retrieved from the ontology that are common to both entities in the pair of entities to the set of the specific type of entities.

19. A non-transitory processor-readable storage medium comprising machine-readable instructions that cause a processor to:
extract individual sections from at least two received documents that include textual content;
select a subset of the individual sections for entity extraction;
extract chunks of candidate text from the textual content as entities of a specific type;
access external data sources for additional entities upon determining that the additional entities are not included in an ontology that includes data related to the specific type of entities wherein the external data sources include webpages with links and results from a search engine;
identify as the additional entities, top K entities similar to the specific type of entities extracted from the at least two received documents, wherein the top k entities are identified from filtered noun phrases of link text and the results of the search engine and K is a natural number; and
expand a set of the specific type of entities associated with the at least two received documents by including the top K entities along with the specific types of entities extracted from the at least two received documents; and
execute automatic actions using the expanded set of the specific type of entities.

20. The non-transitory processor-readable storage medium of claim 19, wherein instructions to expand the set of the specific type of entities for further comprising instructions that cause the processor to:

cluster the set of the specific type of entities and the additional entities into a plurality of clusters;
form pairs of entities from entities in each of the plurality of clusters; and
for each entity in each of the pairs of entities, retrieve related entities from the ontology,
for each of the pairs of entities,
identify the related entities retrieved from the ontology that are common to the entities in the pair of entities; and
add the related entities retrieved from the ontology that are common to the entities in the pair of entities to the set of the specific type of entities.

\* \* \* \* \*